UNITED STATES PATENT OFFICE

FREDRICK J. WALLACE, OF BROOKLYN, NEW YORK, ASSIGNOR TO ROBESON PROCESS COMPANY, OF NEW YORK, N. Y., A CORPORATION OF NEW JERSEY

PRESERVING COAL

No Drawing.        Application filed September 29, 1931. Serial No. 565,919.

This invention relates to preserving coal; and it comprises a process of preserving coal against atmospheric disintegration as well as against dust wherein fresh coal prior to complete air drying is sprayed with a dilute solution of molasses or the like; all as more fully hereinafter set forth and as claimed.

Mined coal is sometimes sold as run of mine but is usually broken and screened to give graded sizes as free of dust and fines as possible. In storage and in shipment, however, dust and fines reappear; partly because of friability and of ordinary abrasion and partly as a result of exposure to air with attendant loss of moisture and oxidation. Mined bituminous coal is usually wet or damp and in air drying beyond a certain point there is often a tendency toward disintegration, this being greater in some coals than in others. Some coals shatter and break down to powder completely by mere exposure to air. To some extent this disintegration, when it occurs is due to simple shrinkage by loss of water. In coals which remain damp disintegration does not ordinarily go far. But there is nearly always at least a tendency towards disintegration in coal in shipment and storage. To some extent, this is due to a break down of gels forming a constituent part of the coal and of more or less hydrated nature.

Dust and fines in sized coal make the handling unpleasant and reduce the merchantability. So far as the nuisance caused by dust is concerned this may be restrained by wetting down the coal with water. As long as the coal is kept damp, dustiness is obviated and the described tendency towards disintegration is not in evidence. The effect of water however is only transitory since the coal soon dries again. To some extent a dilute solution of calcium chlorid has been used in lieu of water; and its anti-dust effect is fairly permanent. Calcium chlorid is a deliquescent salt and its solutions exposed to air do not dry down to a solid but remain permanently liquid and the wetting down effect on dust is permanent wherever the liquid exists. Whatever the original strength of calcium chlorid solution, it comes to a hygrometric balance with the air and is ultimately converted into a dense liquid by evaporation; evaporation going on until the hygrometric balance is obtained. There are however some objections to the use of calcium chlorid since its solutions are corrosive to metals and it tends to make the ash of coal more fusible; in other words it favors the production of clinker in burning. Experience also shows that with most lustrous coals, there is a dimming of the luster.

The use of calcium chlorid solution while effective in obviating a dust nuisance, both from dust originally present and from that formed in storage and shipment, does not hinder the production of dust and fines in storage and transport. On the other hand, it seems to favor disintegration on exposure to air; probably because of its breaking down effect on hydrated gels in the coal. Calcium chlorid as a strongly dissociating saline and has the usual saline effect on hydrated gels of any kind. In the presence of a concentrated solution of calcium chlorid, such as occurs in sprayed coal after standing, the relations of the water in the coal to the rest of the coal are changed.

Various other salines have been proposed as substitutes for calcium chlorid solution and for water but their use has not been extensive or successful.

On the other hand, I have found that by using as a spraying liquid a dilute solution of hygroscopic sugary materials I can restrain the dust nuisance and keep the coal permanently moist to an extent sufficient to obviate the usual tendency toward disintegration by exposure to air. Not only is the dust nuisance obviated but there is less de novo production of dust and fines in standing, storage and shipment. To accomplish these objects the sugary solution should be sprayed on the coal prior to any substantial air drying; prior to any constitutional change in the hydrated gels of the coal. The coal may be allowed to dry to remove the bulk of the water but the sugary solution should be applied before the last residue of water is removed; before the coal becomes really air dried and while it is still damp. Damp coal is not dusty; but the sugary solution prevents drying and dusting.

The cheapest and most convenient material for my purposes is a solution of what is called black strap molasses. This is the final molasses produced by manufacturing sugar from beet and cane; the molasses from which as much sugar as possible has been extracted by crystallization. It may carry around 60 per cent solids, of which less than half is sucrose. In final cane molasses the residual non-sucrose is largely invert sugar which is a hygroscopic material. In final beet molasses there is not much invert sugar but there are other hygroscopic organic solids which are equivalent for the present purposes. In neither variety of molasses is there enough mineral matter to affect the ash of the coal to any extent; and it is not of a character tending toward the production of clinker. Fermented and distilled molasses remaining after the production of alcohol or rum, is also a liquid suitable for my purpose. In it the hygroscopic non-sugary organics are concentrated.

I have found that these residual liquids applied to coal do not dry down completely but retain water, being permanently moist. In the presence of this liquid material as a film over the coal surfaces, the coal does not dehydrate in air to the extent that it will in the absence of the molasses; and the tendency to disintegration with production of dust and fines is checked or obviated. As regards the dust, the bonding effect of the molasses is useful and permanent. The solids of molasses being combustible, they add their effect to the calorific value of the coal.

In the practice of the present invention, run of mine coal or sized coal, as the case may be, is sprayed with a dilute solution of molasses, etc. prior to complete air drying. Sometimes I add a little sodium chlorid or calcium chlorid to the molasses to reduce the freezing point; but ordinarily this addition is not necessary and it is frequently inadvisable. I recommend its use only in extremely low temperatures. In making a spraying solution, one part of ordinary molasses which may be of the kind known in the market as "black strap" is diluted with 4 to 6 parts of water, the diluted solution then being sprayed on the coal with any convenient spraying or atomizing device. The amount used is merely that which will wet and keep down the evident dust. This is usually enough to secure all my ends.

It is desirable to use pressure spraying devices to secure good admixture and to provide each lump or piece with a fine film of liquid. However, great care in spraying is not necessary since the molasses solution does not dry down and does travel and equalize throughout the body of coal on standing. The spray is best applied after the coal has dried enough to lose its sensible moisture but before complete air drying occurs; while it is still somewhat damp. With complete air drying, the described tendency toward disintegration appears and it is then too late to secure all the advantages of the molasses spray.

When it is desirable for advertising or other purposes to give a distinctive look or appearance to coal this may be readily done by admixing dyes or coloring matter with the molasses.

What I claim is:—

1. In the preparation of coal for standing, storage and shipment the process which comprises spraying coal prior to complete air drying with a dilute solution of a residue of sugar manufacture.

2. The process of claim 1 where the residue is black strap molasses.

3. The process of claim 1 where the residue is a fermented and distilled molasses.

In testimony whereof, I have hereunto affixed my signature.

FREDRICK J. WALLACE.

DISCLAIMER 1,910,975.—*Fredrick J. Wallace*, Brooklyn, N. Y. PRESERVING COAL. Patent dated May 23, 1933. Disclaimer filed January 10, 1934, by the assignee, *Robeson Process Company*.

Therefore disclaims claims 1 and 2 of said patent, No. 1,910,975, said claims being in the following words:

"1. In the preparation of coal for standing, storage and shipment the process which comprises spraying coal prior to complete air drying with a dilute solution of a residue of sugar manufacture.

"2. The process of claim 1 where the residue is black strap molasses."

Your petitioner further disclaims any interpretation of claim 3 other than in the preparation of coal for standing, storage and shipment the process which comprises spraying coal prior to complete air drying with a dilute solution of a residue of sugar manufacture where the residue is a fermented and distilled molasses.

[*Official Gazette January 30, 1934.*]